US008528976B2

(12) United States Patent  (10) Patent No.: US 8,528,976 B2
Wimberley  (45) Date of Patent: Sep. 10, 2013

(54) DETACHABLE TAILGATE SEAT

(76) Inventor: Brandon Wimberley, Uvalde, TX (US)

( * ) Notice: Subject to any disclaimer, the term of this patent is extended or adjusted under 35 U.S.C. 154(b) by 90 days.

(21) Appl. No.: 13/280,446

(22) Filed: Oct. 25, 2011

(65) Prior Publication Data

US 2012/0104786 A1 May 3, 2012

Related U.S. Application Data

(60) Provisional application No. 61/407,517, filed on Oct. 28, 2010.

(51) Int. Cl.
*A47C 4/00* (2006.01)
*A47C 4/02* (2006.01)
*A47C 4/42* (2006.01)
*B60N 2/00* (2006.01)
*B60N 2/24* (2006.01)

(52) U.S. Cl.
USPC .......... 297/352; 297/17; 297/252; 297/378.1; 296/57.1; 296/66; 296/69; 24/275

(58) Field of Classification Search
USPC ......... 297/17, 230.1, 230.11, 230.12, 230.13, 297/230.14, 252, 352, 378.1; 296/57.1, 66, 296/69; 224/275
See application file for complete search history.

(56) References Cited

U.S. PATENT DOCUMENTS

| | | | |
|---|---|---|---|
| 2,557,874 A * | 6/1951 | Kailenta | 297/230.12 X |
| 3,041,108 A * | 6/1962 | Cohn | 297/378.1 |
| 3,265,437 A * | 8/1966 | Mincieli | 297/378.1 |
| 4,005,898 A * | 2/1977 | Way | 296/69 X |
| 4,889,383 A * | 12/1989 | Jones | 297/17 X |
| 5,000,504 A * | 3/1991 | Munguia | 296/57.1 X |
| 5,016,792 A * | 5/1991 | Jay | 297/17 X |
| 5,067,771 A * | 11/1991 | Ellis | 297/378.1 |
| 5,215,346 A * | 6/1993 | Reitzloff et al. | 296/51 |
| 5,516,193 A | 5/1996 | Simpson | |
| 5,533,774 A * | 7/1996 | Cavanaugh | 296/66 |
| 5,868,449 A * | 2/1999 | Hitchcock | 296/57.1 |
| 5,971,464 A * | 10/1999 | Davis et al. | 296/57.1 |
| 5,975,610 A * | 11/1999 | Tracy | 296/57.1 X |
| 6,024,397 A * | 2/2000 | Scraver et al. | 296/66 X |
| 6,116,676 A | 9/2000 | Edwards | |
| 6,203,108 B1 | 3/2001 | Mattison, Jr. | |
| 6,273,504 B1 * | 8/2001 | Pace et al. | 297/219.1 |
| 6,286,885 B1 * | 9/2001 | Ramos | 296/57.1 |
| 6,364,391 B1 * | 4/2002 | Everett | 296/57.1 X |
| 6,390,550 B1 * | 5/2002 | Paredes et al. | 297/17 X |
| 6,588,822 B1 * | 7/2003 | Duvall, Jr. | 296/57.1 |
| 6,631,938 B1 * | 10/2003 | Burns | 296/64 |
| 6,644,724 B1 * | 11/2003 | Penaloza et al. | 296/190.02 |

(Continued)

*Primary Examiner* — Rodney B White
(74) *Attorney, Agent, or Firm* — Daniel Boudwin

(57) ABSTRACT

A detachable, foldable seat specially designed to attach to the tailgate of a pickup truck or sport utility vehicle. The device comprises a bench seat, having a bottom seat cushion and a back support cushion attached to a hinge mechanism with a tailgate jamb post. The seat can fold in half at the hinge between the bottom and back support cushion of the device. During installation, the jamb post of the hinge inserts into the jamb between the open tailgate and the truck bed, securing the seat in position. A dual purpose strap attaches to either side of the bottom cushion such that the strap wraps around the open tailgate and further secures the seat in place. When the device is uninstalled and in a closed configuration, the strap serves as a fastening strap to keep the device in a stowed position.

12 Claims, 2 Drawing Sheets

(56) References Cited

U.S. PATENT DOCUMENTS

| | | |
|---|---|---|
| 6,824,186 B2 | 11/2004 | Brown |
| 7,080,870 B1 * | 7/2006 | McCann et al. ................. 296/64 |
| 7,144,079 B2 * | 12/2006 | Syrowik et al. ................. 297/92 |
| 7,163,262 B2 * | 1/2007 | Anglin ....................... 297/217.1 |
| 7,188,899 B1 * | 3/2007 | McClellan-Derrickson . 297/256 |
| 7,201,424 B1 * | 4/2007 | Fournier ...................... 296/57.1 |
| 7,234,770 B1 * | 6/2007 | Schiebl ...................... 297/252 X |
| 7,290,821 B1 * | 11/2007 | McCann et al. ................. 296/40 |
| 7,350,681 B2 * | 4/2008 | Polburn et al. ................. 224/275 |
| 7,431,370 B2 * | 10/2008 | Fournier ................. 296/57.1 X |
| 7,438,355 B2 * | 10/2008 | Pedemonte ..................... 297/17 |
| 7,438,356 B2 * | 10/2008 | Howman et al. ............ 297/17 X |
| 7,513,557 B2 * | 4/2009 | Leigh-Monstevens .. 296/57.1 X |
| 7,735,904 B2 * | 6/2010 | Mahoney et al. ........ 296/190.02 |
| 8,028,641 B1 * | 10/2011 | Sly ................................. 114/363 |
| 8,075,040 B2 * | 12/2011 | Arnold ........................... 296/69 |
| 8,096,600 B2 * | 1/2012 | Shinnoki et al. ................. 296/66 |
| 8,123,271 B1 * | 2/2012 | Wimberley .............. 296/57.1 X |
| 8,152,236 B1 * | 4/2012 | Romero ................... 297/230.11 |
| 8,235,445 B2 * | 8/2012 | Jones et al. .......... 297/230.11 X |
| 8,376,443 B2 * | 2/2013 | Kemp et al. ..................... 296/66 |
| 2002/0109369 A1 * | 8/2002 | Boomhower et al. .... 296/57.1 X |
| 2003/0071505 A1 * | 4/2003 | Ferrell, Jr. ..................... 297/352 |
| 2005/0264048 A1 * | 12/2005 | Collins ..................... 297/188.01 |
| 2008/0211270 A1 * | 9/2008 | Hu et al. .................. 297/188.08 |
| 2009/0224496 A1 * | 9/2009 | Watts .......................... 297/17 X |
| 2010/0060026 A1 * | 3/2010 | Bowers ......................... 296/66 |
| 2010/0308614 A1 * | 12/2010 | Arnold .................. 297/378.1 X |
| 2011/0254333 A1 * | 10/2011 | Taichman et al. .......... 297/230.1 |

\* cited by examiner

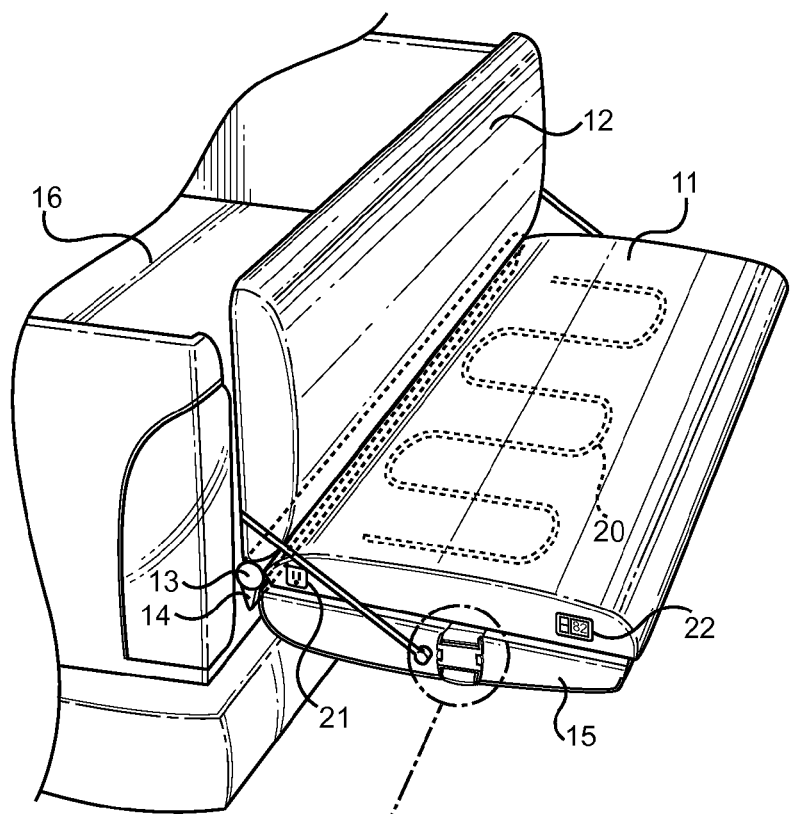
FIG. 1
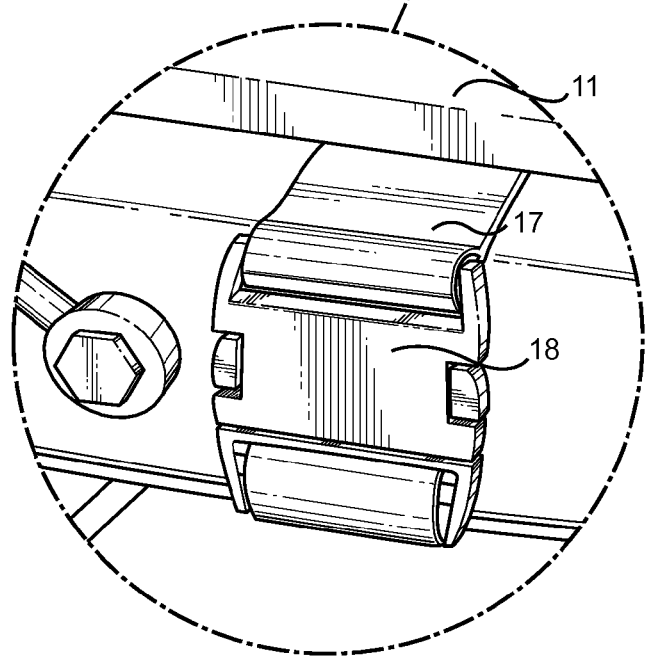

DETACHABLE TAILGATE SEAT

CROSS REFERENCE TO RELATED APPLICATION

This application claims the benefit of U.S. Provisional Application No. 61/407,517 filed on Oct. 28, 2010, entitled "Detachable Tailgate Seat."

BACKGROUND OF THE INVENTION

1. Field of the Invention

The present invention relates to vehicle seating apparatuses for use in a truck bed. More specifically, the present invention describes a removable, comfortable seating option for attaching to the tailgate of a pickup truck. The device comprises a foldable bench seat device having a bottom seat cushion, a back rest seat cushion and a specifically designed hinge with a tailgate jamb post. The present invention can be deployed during an event involving a vehicle tailgate as a bench seat for general use when the tailgate is in a horizontal, open position, thereby allowing the back rest cushion to be opened and accept seated users.

2. Description of the Prior Art

Tailgating is a very popular past time. It is very common to find groups of individuals tailgating at professional sporting events, high school sporting events, county fairs, parades and hunting expeditions. Tailgating is a social activity often associated with outdoor gatherings involving food, friends, drinks and activities prior to or during an event. The very term "tailgating" references the tailgate of a vehicle, whereby individuals utilize the cargo capacity of the vehicle to carry supplies and setup a temporary gathering place there around for enjoyment and socializing. Individuals may congregate around the bed of a pickup truck or sport utility vehicle to engage in outdoor activities such as barbequing, playing sports and consuming refreshments.

Typically the tailgate of the pickup truck or sport utility vehicle is placed in the open, horizontal configuration to provide the gathered individuals with a place to sit. It is very common for individuals to sit on the tailgate during such activities. While the tailgate is a convenient place to sit, it is often uncomfortable because of their rigid construction and hard bed liner surface. Alternatives to sitting on the tailgate include sitting in individual folding chairs or on coolers around the vehicle. Unfortunately, individual folding chairs seat only a single individual at a time and coolers offer no back support to the individual seated thereupon. A bench-style, padded seat with a back support can seat multiple individuals at once and would offer those seated upon it much needed back support and comfort.

The present invention provides a unique, bench-style seat that is temporarily attachable to an open tailgate of a vehicle for such occasions. The device comprises a first and second cushion, which acts as a upright back rest and a horizontal seat bottom that are attached along a common edge to a specifically designed hinge mechanism having an extended tailgate jamb post. The post is an elongated member that protrudes from the rounded hinge and inserts between the opened tailgate and the bed of the vehicle, filling the void created by the jamb. The post secures the location of the seat by restricting fore-aft motion with regard to the vehicle, while allowing a user to life and remove the seat as required. An attached strap provides a means to further secure the seat bottom to the tailgate and prevent dislodgement during use. The strap also functions to secure the device in a stowed configuration when not in use. In an alternate embodiment of the seat cushions, heating elements are provided to allow thermal heating thereof for user comfort in colder conditions.

There have been multiple attempts to develop portable and/or detachable tailgate seating devices with varying degrees of success. For example, U.S. Pat. No. 5,516,193 to Simpson describes a portable, foldable stadium seat device that is capable of seating a single individual. The device is intended to make the seating experience more enjoyable by providing a user with a more comfortable place to sit, as well as to elevate the user slightly higher than he or she would be if sitting on the bench without the use of the Simpson device. The device has a seat and a back rest that fold in half at a junction between the seat and the back rest. The device is designed for attaching to any bench-like seat, including bleachers, tailgates and stadium bench seats. The bottom rear of the device has a small gripping hook that a user catches on the back edge of the bench surface he or she is attempting to attach the portable stadium seat thereto. The bottom front of the device has adjustable hooks that catch the front edge of the bench surface, and are adjusted to securely fasten the seat to the bench. The device can be used on a tailgate when a tailgate is in the open configuration.

Similarly, U.S. Pat. No. 6,203,108 to Mattison Jr. describes a portable folding-chair specifically designed to clip onto the tailgate of a pickup truck or sport utility vehicle when the tailgate is in the open configuration. The chair has a bottom seat, a back rest and arm rests on either side and can comfortably seat a single individual. The chair sits on top of two clips that grip onto the edge of the tailgate to prevent the chair from moving while in use. All parts of the chair frame and clips which make physical contact with the truck bed are coated with a scuff-proof material to prevent any damage to the truck bed that the chair could potentially cause. The frame of the chair is hollow, making the device very light and easy to carry and manipulate. When not in use, the chair folds in on itself for compact storage of the device during transport.

U.S. Pat. No. 6,116,676 to Edwards describes a seating device for use with the tailgate of a vehicle. The device features a pair of seats with a multifunctional arm rest, drink holder and storage compartment in between the two seats. Each seat has a bottom seat and a back support. The seat and back support of the device can be folded down at the pivot axel where the bottom seat meets the back support. Located at the center of the underside of the bottom seat, as well as the backside of the back support, there is an attachment means for connecting a contractual hook to the seat. Contractual hooks are large, broad, flat hooks that attach the seats of the device to the tailgate of the vehicle. Based on the preference of the user, the contractual hooks can either be secured to the backside of the back support the device and hung on a closed tailgate, or the contractual hooks can be attached to the bottom side of the bottom seat and the device can be clipped onto the tailgate when the tailgate is in the open configuration. The hooks incorporate a tightening mechanism that allows for a user to tighten the hooks, causing the hooks to contract, which, in turn, enhances the grip of the hook on the tailgate, preventing the seats from moving during use.

The Simpson and Mattison Jr. devices are only capable of seating a single individual at one time. The Edwards device facilitates the seating of two individuals at once. Users of these devices must sit isolated from others at a tailgate event due to the compartmentalizing nature of the arm rests of each of the described seating apparatuses and only a few, if not only one, of the Simpson, Mattison Jr., or Edwards devices would be able to be attached to a tailgate at a time, limiting the total number of individuals who may utilize the tailgate as a seating option. The present invention offers a bench-style seating device that allows for multiple users to sit on the device at once in close proximity to one another as there are no arm rests to separate or compartmentalize where individuals sits on the present invention.

U.S. Pat. No. 5,975,610 to Tracy describes a mountable tailgate seating device. The device is a bench seat that comprises a seat and a back rest and can be mounted to a tail gate and is designed for easy removal from the tailgate if necessary so as not to impede the use of the truck bed and tailgate for other purposes. The device also features a flat plank that is hitched to the top of the back rest portion of the device, which is rotatable. This flat plank may be used as a table-like surface behind the seats, extending in the opposite direction that the seat is facing. The plank has latches on each of the top corners that can be placed in a position where the latches protrude beyond the parameters of the plank, which enables the plank to rest on the upper ledge of the truck bed to form the table-like surface. When the latches are in a closed position, not protruding beyond the parameters of the plank, the plank also serves as a cover for the seat when the tailgate is either in the closed configuration or in the open configuration.

The Tracy device does not fold into a compact form. Rather, if the Tracy device is attached to the tailgate while the tailgate is in the closed position, the seat is laid back with the back rest portion of the device in the bed of the truck. The hinged cover plate then orients such that it covers the seat of the device, thus occupying a volume of space in the truck bed which cannot be used for other purposes. The present invention also mounts to the tailgate of a vehicle, but is also capable of folding into a compact, flat closed configuration to reduce the amount of space occupied by the present invention when not attached to a vehicle tailgate. The securing straps allow the device to be stowed in a closed position when not in use.

U.S. Pat. No. 6,824,186 to Brown describes a foldable seat system for use with the tailgate of a truck bed. The seat is a bench-style seat with a back support and seat cushions. The device spans the length of the truck tailgate. The device also incorporates a rigid support pole that spans the truck bed, parallel to the tailgate. When the tailgate is down, the device is in the open and useable L-shape position. In the open position, the bottom seat cushion of the device rests on the open tailgate, and the back support cushion of the device rests against the support pole. When the tailgate is up and in the closed position, the Brown device folds at the hinge between the back support cushion and the bottom seat cushion into a U-shape and is stored in place at the rear of the truck bed, against the tailgate, by the support pole.

The hinge on the Brown device allows the back support of the device to pivot freely and thus requires a support pole be installed, in addition to the device, as a means of preventing the back support of the device from opening so widely that the device cannot properly serve as a seat. The support pole can either be mounted into the truck bed, or alternatively, the support pole can be a jamb-type pole, meaning the pole is placed in the truck bed and extended by some mechanism until the pole is fixed in place. If a user desires to adjust the incline of the back support, he or she would need to uninstall the support pole and reinstall it in the desired position that results in the back support having the sought after inclination. The present invention incorporates a ratcheting mechanism in the hinge of the device for the easy adjustment of the incline of the back support cushion of the device.

The present invention differs in structure and method of installation onto a vehicle tailgate. Its design substantially diverges in elements from the prior art, and consequently it is clear that there is a need in the art for an improvement to existing detachable tailgate seating devices. In this regard the instant invention substantially fulfills these needs.

SUMMARY OF THE INVENTION

In view of the foregoing disadvantages inherent in the known types of portable seating devices for use in conjunction with a truck or sport utility vehicle tailgate now present in the prior art, the present invention provides a new detachable tailgate seating device wherein the same can be utilized for providing convenience for the user when attaching the device to a tailgate. The present invention provides a unique means for attachment to a vehicle tailgate, provides a bench-style seating arraignment and further provides an optional benefit of heating coils incorporated into the cushions to provide users with heated seating in colder climates.

It is therefore an object of the present invention to provide a new and improved detachable tailgate seating device that has all of the advantages of the prior art and none of the disadvantages.

It is a further object of the present invention to provide users with a detachable tailgate seating option that is easy and quick to install, use and then uninstall.

Another object of the present invention is to provide a comfortable seating option that provides a user with a cushioned place to sit and provides back support for a plurality of seated individuals in a bench seat configuration.

Another object of the present invention is to provide a tailgate bench seat having a hinge mechanism with a tailgate jamb post for securing the hinge along the tailgate jamb and preventing movement.

Yet another object of the present invention is to provide users of the detachable tailgate seating device with an option to heat the seat cushions of the device by incorporating heating elements into the seat cushions for warmth.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 is a perspective view of the present invention installed on the tailgate of a truck with a magnified view of the buckle and strap fastening the device to the tailgate of the vehicle.

DETAILED DESCRIPTION OF THE INVENTION

Figure 2:
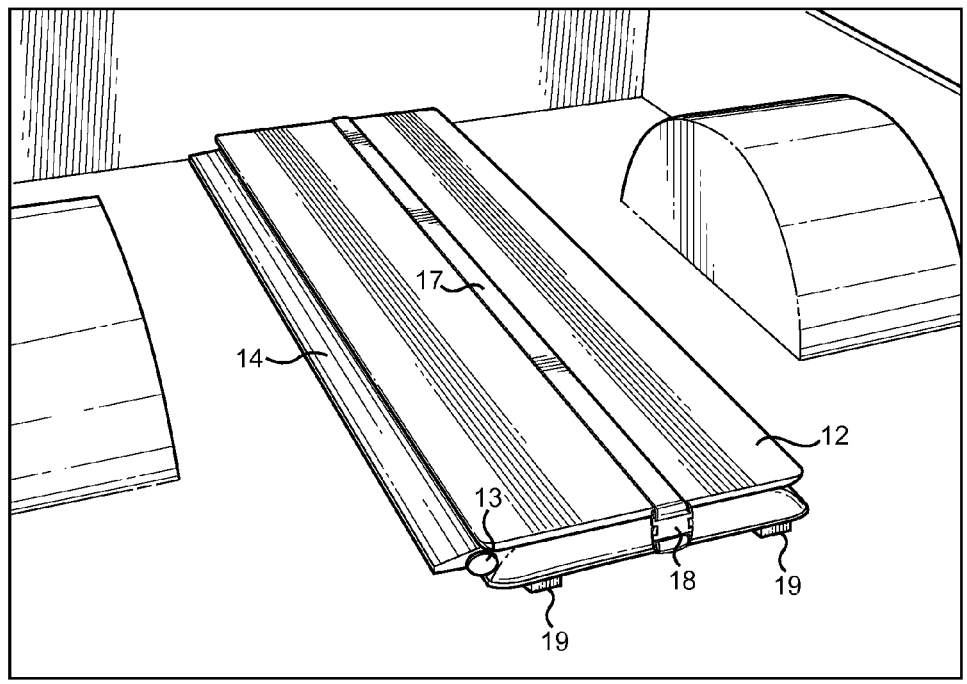
FIG. 2 is a perspective view of the present invention, detached from the truck tailgate and in the folded configuration when not in use.

Reference is made herein to the attached drawings. Like reference numerals are used throughout the drawings to depict like or similar elements of the detachable tailgate seat described by the present invention. For the purposes of presenting a brief and clear description of the present invention, the preferred embodiment will be discussed as installed on a truck tailgate. The figures are intended for representative purposes only and should not be considered to be limiting in any respect.

Referring now to FIG. 1, there is shown a perspective view of the present invention installed on the tailgate 15 of a truck. The device comprises a bench seat frame made from a lightweight, rigid material, such as aluminum or plastic. Use of a light metal material ensures that the device is easy to carry or manipulate during installation, and ensures the durability of the device. The device has a bottom seat cushion 11 and a back support cushion 12 attached to corresponding frame backing members. The bottom seat cushion 11 has a front edge, back edge, two side edges, a top side and a bottom side. The back support seat cushion 12 also has a top edge, bottom edge, two side edges, a front side and a back side. The back side of each cushion is supported by a respective frame member, which may comprise a flat plate that supports the weight of a user or users seated thereagainst. The cover of the cushions may be a waterproof or water resistant material, and manufactured in a variety of colors and sizes, or with special logos, team colors or having pictures of mascots printed thereon.

The seat folds at a hinge mechanism 13 locatable between the bottom cushion 11 and the back support cushion 12 of the device along the common edge. The hinge 13 contains a ratcheting mechanism therein that enables the device to have multiple, detented configurations—an open configuration, wherein the device operates as a bench seat; a closed configuration, wherein the device is folded on itself to conserve space; and various degrees of inclination of the back support seat cushion as desired by a user, providing differing degrees of recline when in a working position. The hinge and ratcheting mechanism are designed to limit how wide the seat may open and allows a user to set a desired angle at which the back support cushion inclines to optimize user comfort. The hinge comprises an elongated cylinder with external attachments to the respective bottom cushion and back support cushion frame members. Extending vertically downward from the cylindrical hinge mechanism 13 is a tailgate jamb post 14, which is adapted to be inserted into the jamb between the tailgate 15 and the vehicle bed 16. The jamb is an open space wherein the hinge for the tailgate is located, and is expanded into an open configuration when the tailgate is lowered. The post 14 is vertically inserted into the jamb location to secure the seat and prevent movement in a horizontal plane. When the device is removed, the post 14 is vertically lifted from the jamb to allow the seat back 12 and bottom 11 to be condensed together into a stowed configuration. The relative angle of the post 14 with respect to the seat bottom 11 is adjustable to accommodate different vehicle geometries. Further, the post may be a continuous post, or a plurality of segmented posts so as not to interfere with existing tailgate hinge hardware installed onto the vehicle.

FIG. 1 also shows a perspective magnified view of the strap attachment means. A tailgate fastening strap 17 is used for vertically securing the seat device to the open tailgate 15, and is connected to either side of the bottom seat cushion 11. The tailgate fastening strap 17 has two ends, a first end and a second end, which connect to one another by a strap attachment means 18 around the exterior of the tailgate 15 to secure the assembly thereto. The strap attachment means 18 can include, but is not limited to, hook and eye fasteners, snaps, a buckle or a latch. The strap provides a length adjustability to allow taught securement of the strap 17 around the tailgate during use. While resting the jamb post 14 within the tailgate jamb in conjunction the tailgate fastening strap 17 stabilizes the seating device such that it does not move while in operation or while users are sitting, getting up from or leaning against the seat.

To further stabilize the present invention during use, one embodiment of the seating device incorporates the use of a protective rubber pad—or pad made of a similar material—placed along the base of the seat bottom cushion 11 and against the tailgate 15 to both improve the grip between the seating device and the tailgate, thus further preventing the device from moving around during normal use and protecting the tailgate from any potential scratches or damages that could be caused by the present invention as it makes contact with the tailgate of the vehicle. The protective pad is provides a protective interface between the device and the tailgate 15 during use.

An further embodiment of the present invention incorporates a set of support posts or legs 19 in place of the protective pad along the base of the bottom seat cushion 11, whereby a gap is provided between the tailgate 15 and the bottom seat cushion 11 when in use. The legs 19 support the device, wherein each leg is covered by a layer of rubber, or similar protective, high friction material for the purpose of improving the grip between the seating device and the tailgate and also protecting the tailgate from any potential scratches or damage that could result by the legs 19 making contact with the tailgate during use. The legs on the device increase the elevation of the seated users on the device.

Referring now to FIG. 2, there is shown a perspective view of the present invention when the device is not in use and in the closed, stowed configuration within the bed of a truck. The seating device is capable of folding at the hinge 13 into a compact space for easy transport and storage. When the device is folded in half, the tailgate fastening strap 17 is wrapped around the back support cushion 12 and fastened to the strap attachment means 18, preventing the seating device from accidentally opening during transportation and storage of the device. In this view, the hinge mechanism tailgate jamb post 14 is further visualized.

Tailgating is a very popular outdoor activity, and individuals participate in tailgating regardless of whether it is cold outside. A further embodiment of the present invention (shown in FIG. 1) incorporates a series of heating elements 20 within the seat cushions 11, 12 of the device to provide heated seating during tailgating during cooler weather. Heating elements 20 can be incorporated into the bottom seat cushion 11, the back support cushion 12, or both to increase the temperature of the respective cushion and provide warmth to a seated user. The heating elements are preferably powered by the vehicle's onboard electrical system, receiving power via an auxiliary power port 21 such as a cigarette lighter. The device may further be powered by a generator if available. This variation of the present invention incorporates a temperature controller 22 and would incorporate safety mechanisms therewith so as to protect users from exposure to temperatures beyond the design limits of the device that may be unsuitably high or unsafe.

Use of the present invention is not limited only to tailgating for the purposes of attending sporting events or barbeque events. The present invention can be useful for general outdoor seating purposes, such as a resting place for construction workers who are on the job site with nowhere else to sit, or the device can be used as a place to perch during a hunting or fishing expedition. Furthermore, the size of the overall device is not limited. The present invention can be manufactured in a variety of sizes to accommodate use with various sized vehicle tailgates.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A detachable, foldable bench seat device for attachment to a vehicle tailgate, comprising:
    a seat frame having a seat back and seat bottom plate;
    said seat bottom plate having a bottom seat cushion, a front edge, back edge, two sides edges, a top side and a bottom side;
    said seat back having a back support seat cushion, a top edge, bottom edge, two sides edges, a front side and a back side;
    said back edge of said bottom seat cushion and said bottom edge of said back support connect together via a hinge;
    said hinge having a ratcheting mechanism for angle adjustment between said back support and said bottom seat cushion
    said hinge further comprising an elongated tailgate jamb post for placement within a vehicle tailgate jamb when in use, and wherein said jamb post extends outward from a portion of said hinge distal from a line of connection between said back support seat cushion and said bottom seat cushion;
    a tailgate fastening strap attached to said bottom seat having a first and second end and a strap attachment means.

2. The device of claim 1, wherein said frame is made of light weight aluminum.

3. The device of claim 1, wherein said hinge and said ratcheting mechanism of said device provide multiple seat configurations—an open configuration, wherein said device operates as a bench seat; a closed configuration, wherein said device is condensed together so as to conserve space; and a series of intermediary degrees of inclination of said back support seat cushion with respect to said bottom seat.

4. The device of claim 1, wherein said bottom seat cushion and said back support cushion are covered in a waterproof material.

5. The device of claim 1, wherein said tailgate fastening strap first and second end attaches to either side edge of said bottom seat cushion and connect to each other by said strap attachment means.

6. The device of claim 5, wherein said strap attachment means is a buckle.

7. The device of claim 1, wherein said bottom side of said seat bottom further comprising a protective, high friction pad.

8. The device of claim 7, wherein said protective pad is made of rubber.

9. The device of claim 1, wherein said bottom side of said seat bottom further comprising a plurality of upstanding posts to support said seat bottom in an elevated position above said vehicle tailgate.

10. The device of claim 1, wherein said bottom seat cushion and said back support cushion incorporate heating elements within said cushions.

11. The device of claim 10, wherein said heating elements are powered by onboard vehicle power via an auxiliary power port and plug from said heating elements.

12. The device of claim 10, wherein said heating elements further incorporates a temperature controller for regulating said heating elements.

* * * * *